Sept. 11, 1951     E. T. BOTH ET AL     2,567,470
RELAYING AND INDICATING MEANS
USABLE WITH RACE TOTALIZATORS Filed Sept. 16, 1948     5 Sheets-Sheet 1

Inventors
E. T. Both
F. S. Grace
By Glascock Downing Rutbold
Attys.

Patented Sept. 11, 1951

2,567,470

UNITED STATES PATENT OFFICE 2,567,470

RELAYING AND INDICATING MEANS USABLE WITH RACE TOTALIZATORS

Edward Thomas Both, Cremorne, near Sydney, and Frederick Spencer Grace, Meadowbank, near Sydney, New South Wales, Australia, assignors to Automatic Totalisators Limited, Meadowbank, near Sydney, New South Wales, Australia, a company of New South Wales, Australia Application September 16, 1948, Serial No. 49,634
In Australia September 24, 1947

2 Claims. (Cl. 235—61)

This invention relates to devices for relaying and indicating odds ratios, or other values, and is particularly usable in race totalisators of the kind which incorporate odds computing devices in respect of each competitor in an event, whereby the ratio of investment on all competitors in the event to that for a single competitor in the same event is calculated and transmitted to an odds indicator through relay devices. The odds obtaining at any instant in such a transaction run, may be manifested in terms of the angular disposition of a blade lever, this angularity being employed for consonant operation of a relay unit which actuates one or more odds "indicators."

The object of this invention is the provision of relay and indicator means, which, while reliable and accurate in operation, are extremely simple and inexpensive to construct, maintain, install and operate, in comparison with such devices as devised heretofore.

The invention may be summarised as mainly consisting in a transmitter potentiometer, a receiver potentiometer bridge-circuited with the transmitter potentiometer, means for varying the resistance value of the transmitter potentiometer in correspondence with odds ratio or other value variations, a moving coil relay connected across the bridge constituted by the transmitter and receiver potentiometers, contacts closable in correspondence with direction of current flow through the relay, driving solenoids circuited with the contacts, indicator devices, a movable contact for the receiver potentiometer, and drive transmission mechanism operable by the solenoids for actuating the indicator devices and the movable contact.

An example of the invention is illustrated in the accompanying drawings, together with sufficient details of a typical odds computing unit as will enable the present invention and the manner of its performance to be readily understood.

Figure 1:
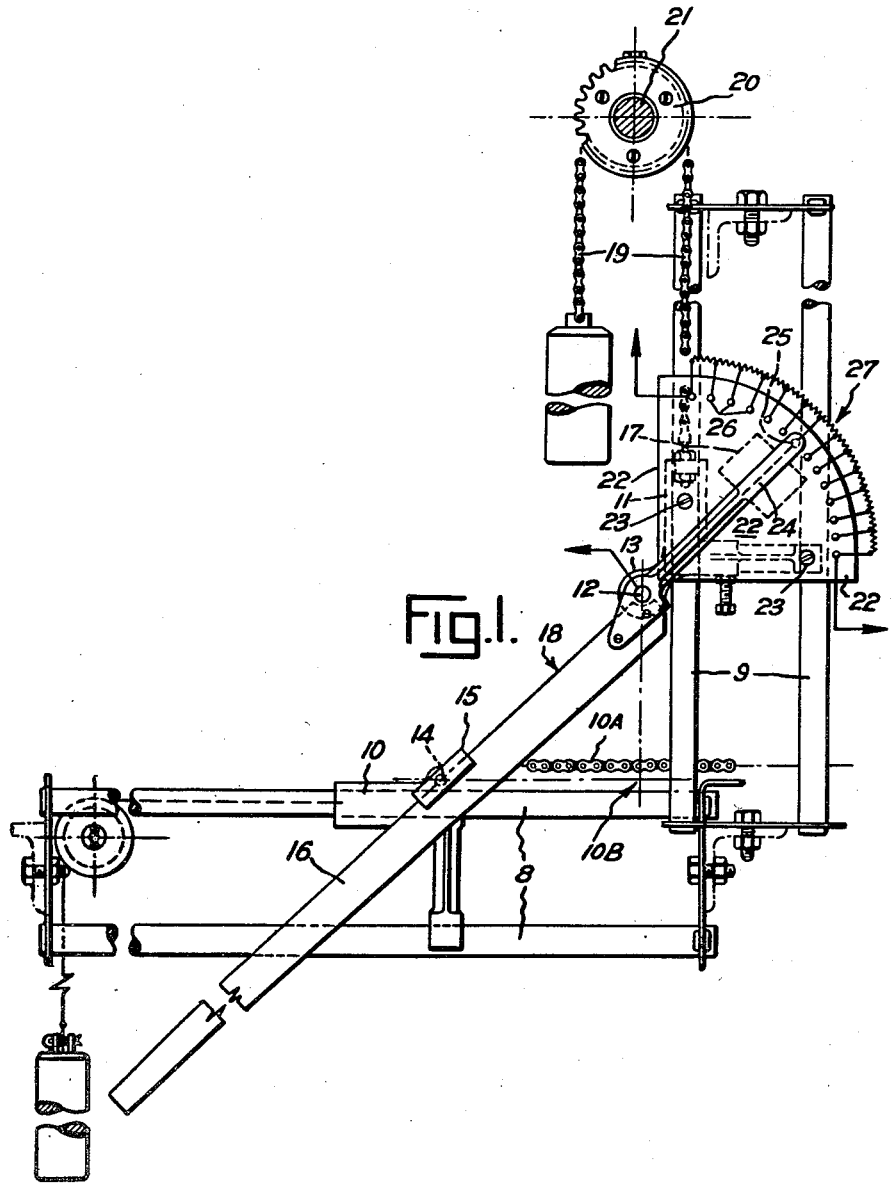
Figure 1 illustrates the main parts of a totalisator odds computing unit to which the present invention is applicable, together with a transmitter contact arm and a transmitter potentiometer forming part of the invention.

Referring mainly to Figure 1 of the drawings, the typical odds unit comprises a pair of guide runways 8 and 9 at right angles to one another. Each of the runways 8 and 9 has a slider 10, 11 thereon which is freely slidable longitudinally of its runway.

Each of the sliders 10, 11 has what may be called a significant horizontal axis. These axes of the two sliders are parallel. In the slider 11 the significant axis is that of a fulcrum pin 12 mounted in a bracket portion 13 of the slider 11. In the slider 10 the significant axis is that of a similar fulcrum pin 14 which carries a freely revoluble channel-sectioned abutment shoe 15. This shoe 15 is so mounted that the plane of the floor of its web intersects the significant axis of the slider 10. On the fulcrum pin 12 is mounted a rigid blade arm 16 which extends obliquely downwardly as a hypotenuse to the right angle formed by the loci of the sliders 10 and 11, the blade arm being so arranged, and also by virtue of the loading of a counterweight 17, that one of its edges 18 bears upwardly and slidably against the web floor of the shoe 15.

The blade edge 18 therefore intersects the two significant axes.

Operation of the odds unit is effected by sprocket chain 19, sprocket wheel 20 keyed to line shaft 21. This shaft is rotated in direct proportion to the total number of transactions accumulated by a grand total adding unit.

The slider 10, which is the competitor slider, is prevented from moving outwardly by a sprocket chain 10A or the like, which has one end anchored to the slider and is enmeshed by a sprocket or gear (not shown) on the competitor adding unit. This sprocket or gear is one which is rotated by the competitor adding unit in direct proportion to the number of transactions recorded thereby. When the sprocket or gear is rotated, it pays out the sprocket chain 10A enmeshed therewith and this enables the weight urged competitor slider 10 to move away from the locus junction point indicated at 10B.

Thus the distance of the competitor slider 10 from the junction point 10B, is directly proportional to the count of transactions accumulated in the associated adding unit in respect to the competitor to which that adding unit is peculiar and the distance of the slider 11, which is the grand total slider, from the junction point 10B, is directly proportional to the grand total of transaction for all competitors in the event in respect of which tickets are being issued. It follows from the foregoing that the angular disposition of blade 16 is a function of the odds prevailing in respect of the particular competitor to which the odds unit is related.

A sector plate 22 is centred in the fulcrum 12 and fixedly connected to the vertical slider 11 by screws or the like 23, said sector plate being linearly (vertically) movable with slider 11 but not otherwise movable relative to the machine base or frame.

The blade arm 16 carries an extension or contact arm 24 which at its free end is furnished with a contact button 25 which is able to sweep across a row of contacts 26 on the sector plate. These contacts 26 are tappings of the transmitter potentiometer 27.

This transmitter potentiometer 27 is circuited with a similar "receiver" potentiometer 28 (see Figure 2) to constitute a common Wheatstone bridge resistance circuit. A suitable direct current is supplied to the system as shown. The current is intermittent by virtue of a distributor in the supply circuit and is commonly known as the basic impulse.

Figure 2:
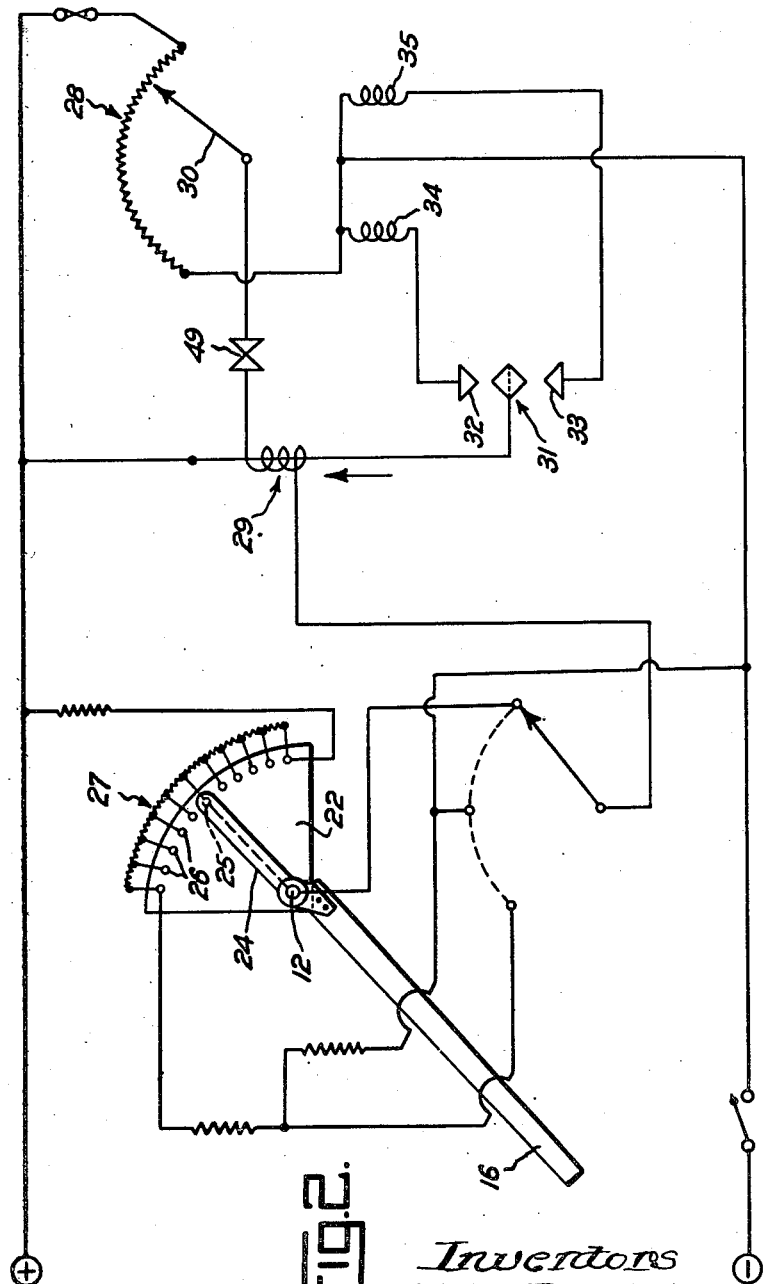
Figure 2 is a circuit diagram.

Referring mainly in Figure 2, a moving coil relay 29 is connected between the contact arm 24 of the transmitter potentiometer 27 and a similar (or "second") contact arm 30 associated with the receiver potentiometer 28.

Figure 3:
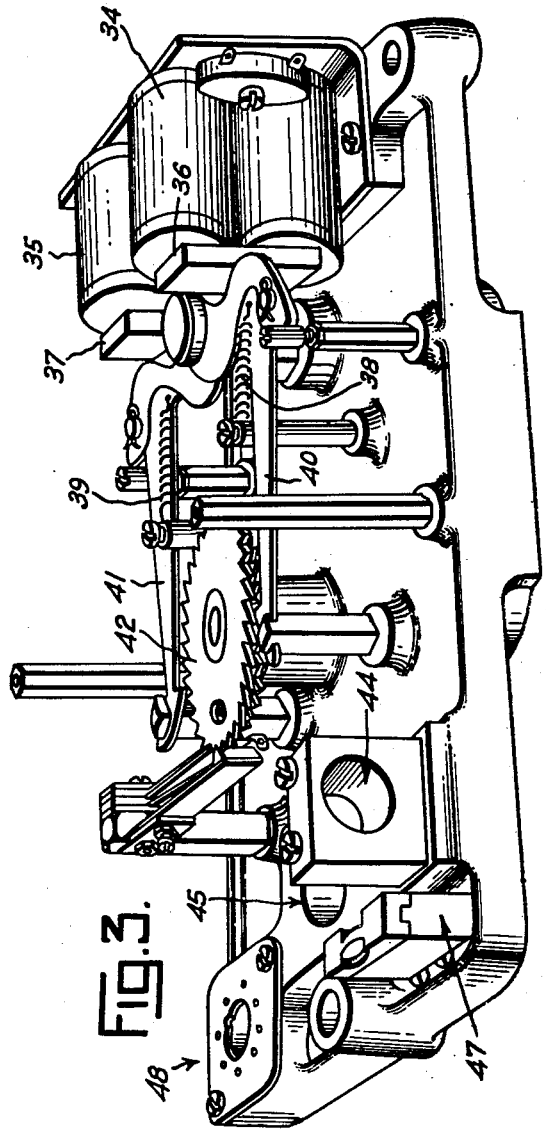
Figure 3 is a perspective view of the odds projection indicator.
Figure 4:
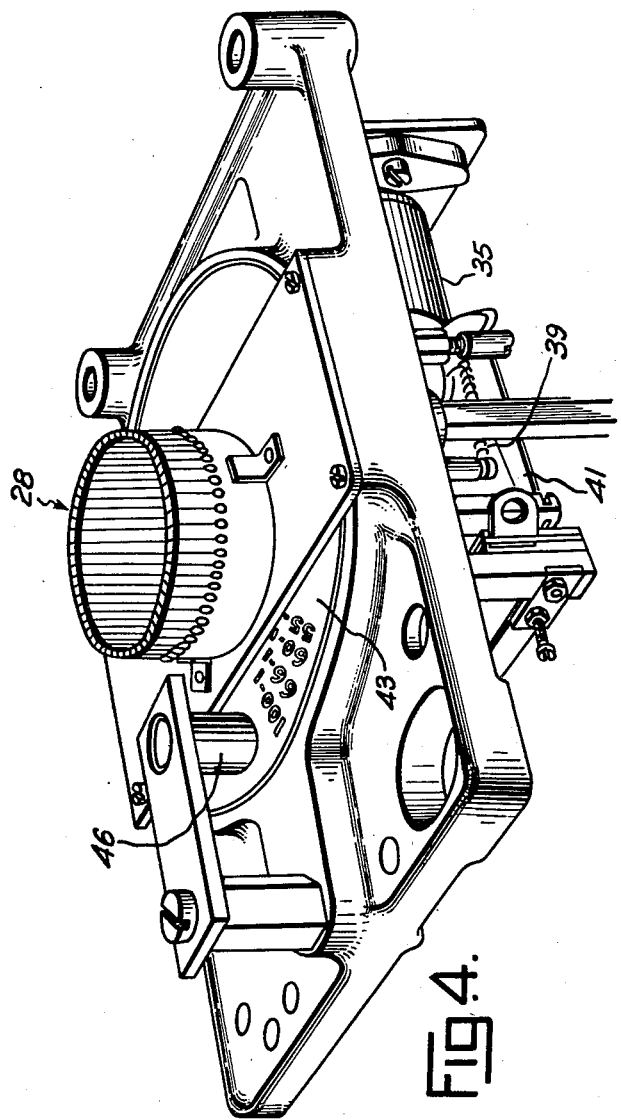
Figure 4 is an inverted perspective view of the indicator shown in Figure 3.
Figure 5:
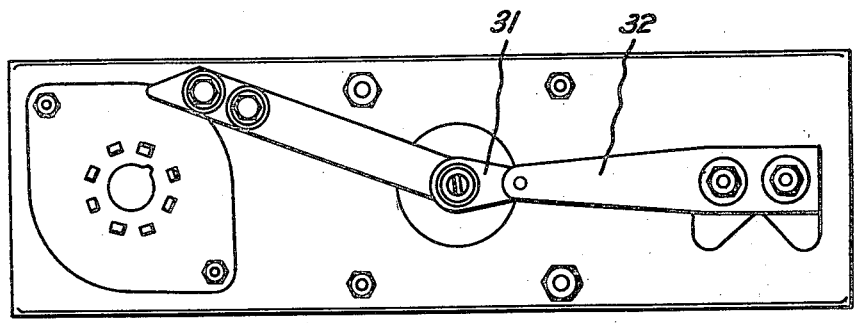
Figure 5 is a plan of a moving coil relay unit shown diagrammatically in Figure 2.
Figure 6:
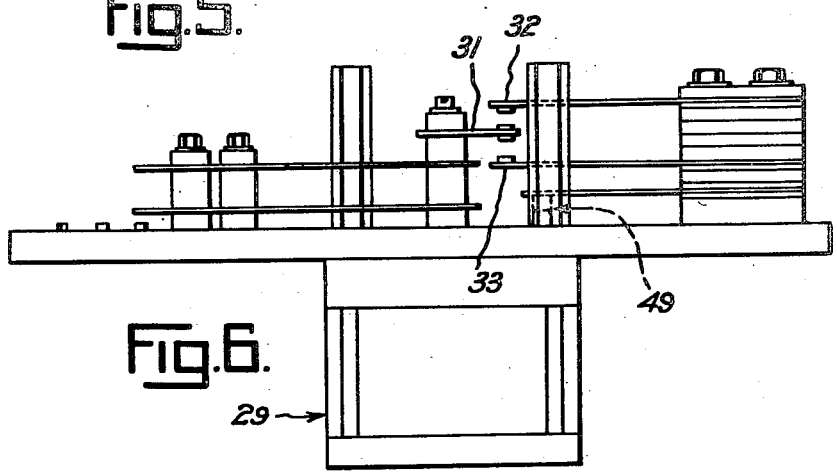
Figure 6 is a side elevation projected from Figure 5.

The relay 29 carries a switch arm, diagrammatically illustrated at 31 in Figure 2, and in more detail in Figures 5 and 6, said switch arm being adapted to close either pair of two pairs of contacts 32 and 33 respectively circuited with two driving solenoids 34 and 35 whereof the armatures 36 and 37 (loaded by springs 38 and 39) are partly formed by, or linked to, a pair of pawls 40 and 41 (see Figure 3) operable on diametrically opposite points of a ratchet wheel 42 which has the "second" contact arm 30 attached relative thereto, said contact arm 30 being adapted to sweep across the balancing resistance or receiver potentiometer 28 as seen in Figures 2 and 4.

The ratchet wheel 42 also actuates an odds display device which consists of a disc 43 keyed upon the ratchet wheel shaft and having "odds" numbers inscribed thereon for individual display through a sight window or for projection on a display screen or the like, said latter arrangement incorporating a lamp holder 44 (Figure 3) for projecting a light source through aperture 45 and projection lens 46 (Figure 4). A fuse block 47 and power socket connection 48 are provided as seen in Figure 3.

Referring to Figure 6 an overload contact 49 is preferably provided in the event of heavy electrical loads being imposed on the moving coil relay 29.

In use the blade arm 16, on changing its angular disposition in correspondence with a change in the odds for the competitor to which it relates through the intermediary of sprocket wheel 20 on line shaft 21, similarly changes the position of the contact arm 24, which sweeps across the transmitter potentiometer 27. At any point along the potentiometer 27, between its extremities, the contact arm 24 will have a particular potential relative to its position.

The arm 30 sweeping across receiver potentiometer 28 will have a similar though not yet equal potential by virtue of its position relative to the extremities thereof. Because of the different potential of contact arm 24 and arm 30, the moving coil relay 29 will move either up or down according to whether arm 24 or arm 30 has the higher potential, thus causing switch arm 31 to close either contact 32 or 33.

If arm 24 is more anticlockwise than arm 30 (looking at Figure 2) the coil relay 29 will rise, closing contact 32 and energising driving solenoid 34. By the mechanical linkage of pawl 40 and ratchet wheel 42 (Figure 3) arm 30 is caused to move across potentiometer 28 anticlockwise one pitch (about 10°) during the duration of one basic impulse. If this movement equalises the position and potential of arm 24 and 30, the coil relay 29 will return to neutral.

If, on the other hand, the movement of arm 30 is insufficient to equalise the potential, the coil relay 29 will rise again on the next basic impulse and again energise the driving solenoid 34 and so step the arm 30 a second pitch. It will be noted that arm 30 will always be slave to arm 24 and cannot at any time overrun the electrical position of arm 24 with respect to its position on transmitter potentiometer 27.

As arm 24 moves either to right or left, arm 30 must follow on each basic impulse. In order to guard against damage to the electrical circuit, if arm 24 should move a large distance quickly, the difference in potential between arm 24 and arm 30 will be large, throwing a heavy electrical strain on the relay coil 29. This causes relay coil 29 to open the overload contact 49 thus breaking circuit.

It will be seen that the step by step movement of ratchet wheel 42 imparts the required movement to indicator disc 43 which carries the "odds" indicia for projection through lens 46 on to a display screen or the like.

It is to be understood that the computing mechanism of Figure 1 is included herein only by way of example, in that the contact arm 24 (or an equivalent movable member) may be operated by other mechanism or even manually, for the relaying and consequent display of odds ratios, dividend amounts, or other quantities, amounts, or ratios which are herein intended to be included in the terms "value" or "values."

We claim:

1. A relaying and indicating means for use in race totalisators comprising, a transmitter potentiometer coil and a receiver potentiometer coil connected in parallel across the direct current line thereby to constitute a Wheatstone bridge resistor network, a movable contact arm associated with said transmitter coil, means for moving said contact arm in correspondence with value variations, a second movable contact arm associated with said receiver coil, a moving coil relay connected between said contact arms therewith to constitute a bridge conductor for said network, an indicator shaft whereon said second contact arm is fixed, a display element on said shaft, a pair of oppositely toothed ratchet wheels fixed on said shaft, a movable switch arm operable by said moving coil relay, a pair of stationary contacts alternatively contactable by said switch arm, a pair of solenoids respectively connected to said stationary contacts, and a pair of spring-loaded pawls respectively associated with said ratchet wheels and respectively operable by said solenoids.

2. A relaying and indicating device for use in race track totalizators operable on a direct current line and including a grand total adding unit and a competitor adding unit, comprising a transmitting potentiometer including a lever mounted on two pivots movable along intersecting lines at right angles to each other, means for moving one of said pivots in accordance with the registration of the grand total adding unit, means for moving the other unit in accordance with the registration of the competitor adding unit, said transmitting potentiometer including a resistance coil connected across the direct current line and over which the potentiometer lever moves, a receiver potentiometer including a resistance coil also connected across the direct current line and an arm movable over said coil, a movable coil relay having a switch arm and a pair of fixed contacts engaged thereby in alternate directions of oscillation, a conductor connecting the switch arm to one side of the direct current line, a conductor connecting the lever of the transmitting potentiometer to the coil of the moving coil relay and a continuation conductor connecting the latter coil to the arm of the receiver potentiometer to constitute a Wheatstone bridge network, a rotatable indicator shaft mounting the arm of the receiver potentiometer, indicator disc, and a pair of oppositely toothed wheels, a pair of electro-magnets each connected to one side of the resistance coil of the receiver potentiometer and to the other side of the direct current line and respectively to fixed contacts of the movable coil relay and a pair of spring-loaded pawls respectively in engagement with said ratchet wheels and operable by said electro-magnets to position the indicator disc for showing the ratio of the investment on all competitors in an event to that for a single competitor in the same event.

EDWARD THOMAS BOTH.
FREDERICK SPENCER GRACE.

REFERENCES CITED

The following references are of record in the file of this patent:

UNITED STATES PATENTS

| Number | Name | Date |
| --- | --- | --- |
| 1,335,596 | Morison | Mar. 30, 1920 |
| 1,447,403 | Atherton | Mar. 6, 1923 |
| 1,963,907 | Julius et al. | June 19, 1934 |
| 2,108,146 | Simpson | Feb. 15, 1938 |
| 2,271,508 | Gordon | Jan. 27, 1942 |

FOREIGN PATENTS

| Number | Country | Date |
| --- | --- | --- |
| 340,987 | Great Britain | Dec. 29, 1930 |
| 434,273 | Great Britain | Aug. 26, 1935 |